United States Patent [19]

David et al.

[11] Patent Number: 5,021,192
[45] Date of Patent: Jun. 4, 1991

[54] COLLOIDAL DISPERSIONS OF CERIUM (IV) COMPOUND

[75] Inventors: Claire David; Claude Magnier, both of Paris, France

[73] Assignee: Rhone-Poulenc Chimie, Courbevoie, France

[21] Appl. No.: 30,133

[22] Filed: Mar. 26, 1987

[30] Foreign Application Priority Data

Mar. 26, 1986 [FR] France .................. 86 04348

[51] Int. Cl.$^5$ ........................... B01J 13/00
[52] U.S. Cl. .................. 252/313.1; 423/395; 423/396; 423/397
[58] Field of Search .......... 252/313.1; 423/395, 423/396, 397

[56] References Cited

U.S. PATENT DOCUMENTS

| | | |
|---|---|---|
| 3,024,199 | 3/1962 | Pasfield . |
| 3,761,571 | 9/1973 | Woodhead . |
| 4,606,847 | 8/1986 | Woodhead .................. 252/313.1 |
| 4,699,732 | 10/1987 | Woodhead .................. 252/313.1 |

FOREIGN PATENT DOCUMENTS 2075478 11/1981 United Kingdom .

OTHER PUBLICATIONS

Chemical Abstracts 67(6):26296j.
Nikolaev et al, *Russian Journal of Inorganic Chemistry*, vol. 12, No. 4 (1967).

*Primary Examiner*—Wayne A. Langel
*Attorney, Agent, or Firm*—Burns, Doane, Swecker & Mathis

[57] ABSTRACT

Highly concentrated, aqueous colloidal dispersions of a cerium (IV) compound, adapted for the impregnation of catalyst supports, are prepared by reacting an aqueous solution of a cerium (IV) salt with a base, to precipitate a certain cerium hydroxynitrate, separating and washing said precipitate, and then dispersing the washed precipitate in an aqueous acid medium.

19 Claims, No Drawings

COLLOIDAL DISPERSIONS OF CERIUM (IV) COMPOUND

CROSS-REFERENCE TO RELATED APPLICATIONS

Copending applications, Ser. No. 030,125 and Ser. No. 030,134, both filed concurrently herewith and both assigned to the assignee hereof.

BACKGROUND OF THE INVENTION

1. Field of the Invention

The present invention relates to novel aqueous colloidal dispersions of a cerium (IV) compound having high cerium concentrations and to a process for the preparation thereof.

2. Description of the Prior Art

It is known to this art from Kirk-Othmer, *Encyclopedia of Chemical Technology*, Second Edition, Vol. 4, p 850, that it is possible to prepare a hydrated ceric dioxide of the Formula $CeO_2 \cdot x\ H_2O$, wherein x is a number ranging from 0.5 to 2, the compound being present in the form of a gelatinous precipitate, by the addition of ammonium or sodium hydroxide to solutions of ceric salts.

French Patent No. 2,482,075 describes preparation of a cerium (IV) compound dispersible in water by dispersing an essentially dry hydrate of cerium (IV) oxide in an aqueous medium, said oxide having been heat treated at a temperature of from 200° C. to 450° C. in the presence of a deaggregating agent, in particular nitric acid. In this manner, heating in the presence of the deaggregating agent effects disintegration of the aggregated crystallites in the hydrate of cerium (IV) oxide, thereby producing a cerium compound that is dispersible in water.

It is noted in the '075 patent that the preparation of the hydrate of cerium (IV) oxide may be by precipitation from a cerium salt; thus, for example, a high purity cerous carbonate may be dissolved in a solution of nitric or hydrochloric acid in order to provide a neutral solution of cerous nitrate or chloride, which is oxidized with $HN_4OH/H_2O_2$ to produce the hydrate of cerium (IV) oxide In this prior art process, dispersions of coarse colloids of the hydrate of cerium (IV) are produced, said coarse colloids having particle sizes greater than 500 Å.

SUMMARY OF THE INVENTION

Accordingly, a major object of the present invention is the provision of aqueous colloidal dispersions having high cerium concentrations from a cerium (IV) compound directly dispersible in an aqueous acid medium, and without the necessity for any intermediate drying stage.

Briefly, the aqueous colloidal dispersions according to the invention having high cerium concentration are produced by a process which comprises:

(i) preparing a cerium hydroxynitrate having the Formula (I):

$$Ce(OH)_x(NO_3)_y \cdot nH_2O \qquad (I)$$

wherein:

y ranges from 0.25 to 0.35;
x is such that $x = 4-y$;
n ranges from about 0 to about 20 and preferably from 2 to 5, by reacting an aqueous solution of a cerium (IV) salt with a base;

(ii) separating the precipitate thus produced;
(iii) washing such precipitate; and
(iv) directly dispersing the washed precipitate in an aqueous acid medium.

DETAILED DESCRIPTION OF THE PREFERRED EMBODIMENTS OF THE INVENTION

More particularly according to the present invention, it has now been determined that in order to produce aqueous colloidal dispersions concentrated in cerium values, it is necessary to use a cerium (IV) hydroxynitrate of the Formula (I) having the characteristics described below, and prepared by the process also described below.

The chemical composition of the compound of the Formula (I) is confirmed qualitatively:

(I) By infrared spectrophotometry:

The spectrum obtained by pelleting in KBr enables determination of the following characteristic peaks:

$OH^-$ band $= 3450\ cm^{-1}$ $NO_3$ bands:
$NO_3^{31}$ bonds of the covalent type: $1320\ cm^{-1}$ $1470\ cm^{-1}$ $1045\ cm^{-1}$
$NO_3^-$ bonds of the ionic type: $1385\ cm^{-1}$ $820\ cm^{-1}$ The compound of the Formula (1) includes a high proportion of nitrate bonds of the ionic type, which is confirmed by Raman spectrum, which shows an intense peak at $1050\ cm^{-1}$.

(2) By differential thermal analysis

The product is calcined under a controlled atmosphere of dry air using a temperature increase of 300° C. per hour. The results obtained are as follows:

150° C.: endothermic peak corresponding to a loss of water;
420° C.: endothermic peak corresponding to a loss of $NO_x$.

The chemical composition of the compound of the Formula (I) is confirmed quantitatively by thermogravimetry:

The results thereof are reported in the following table:

| | |
|---|---|
| 25/310° C. | 40.5% to 59.6% |
| 280/500° C. | 3.9% to 5.6% |
| ΔP 1000° C. | 44.4% to 65.2% |

According to the process of the invention, in the first stage a compound of the Formula I is prepared by reacting a solution of a cerium (IV) salt with a base, in a manner such that the pH of the reaction medium ranges from 4 to 9.

For this purpose, a solution of cerium (IV) is used which may be an aqueous solution of ceric nitrate. This solution may contain, without disadvantage, cerium in the cerous state, but it is desirable in order to obtain a good yield of precipitation that it contain at least 85% cerium (IV).

The solution of the cerium salt is selected such that it will not contain impurities that may remain in the final product. It is advantageous to use a cerium salt solution having a purity of greater than 99%.

The concentration of the cerium salt solution is not a critical factor according to the invention and may vary over wide limits. When it is expressed as cerium (IV), it advantageously ranges from 0.3 to 3 moles/liter and preferably from 0.5 to 1.5 moles/liter.

The aqueous solution of the cerium (IV) salt typically has a certain initial acidity, and may have a normality of from 0.01 N to 5 N. The H+ ion concentration is not critical. It is desirable that it range from 0.1 N to 1 N.

As one starting material, a ceric nitrate solution is used, prepared by the action of nitric acid on a hydrated ceric oxide produced in a conventional manner by the reaction of a solution of a cerous salt, for example, cerous carbonate, with an ammonia solution in the presence of an oxidizing agent, preferably hydrogen peroxide.

The ceric nitrate solution prepared by electrolytic oxidation of a solution of cerous nitrate, as described in French Patent No. 84/13,641, is the preferred starting material.

In one embodiment of the invention, an aqueous solution of a cerium (IV) compound is used which has already been pre-neutralized by addition of a basic solution thereto, preferably an ammonia solution in an amount such that the proposition of neutralization is higher than or equal to $-4$ and less than or equal to 2.

The proportion of neutralization r is defined by the following equation:

$$r = (n_3 - n_2)/n_1$$

wherein:

$n_1$ is the number of $Ce^{IV}$ moles present in the ions/colloids resulting mixture, $n_2$ is the number of moles of $OH^-$ necessary to neutralize the acidity introduced by the aqueous solution of the cerium (IV) salt, $n_3$ is the total number of $OH^-$ moles introduced by the addition of the base.

As a practical manner, in order to attain the desired degree of neutralization within the aforementioned range for a given cerium (IV) concentration in the resultant ions/colloids mixture, the concentration of the basic solution is adjusted such that it satisfies the following equation:

$$[OH^-] = n_1 \cdot r + n_2)\ [Ce(IV)]_j [Ce(IV)]_f / n_1\ [Ce(IV)]_j [Ce(IV)]_f$$

wherein $[OH^-]$ represents the concentration in moles/liter of the basic solution;

$[Ce(IV)]_f$ is the Ce (IV) concentration in moles/liter in the resulting ions/colloids mixture;

$[Ce(IV)]_j$ is the Ce (IV) concentration in moles/liter of the aqueous solution of the cerium (IV) salt;

$n_1$ and $n_2$ are determined by conventional analysis of the aqueous solution of the cerium (IV) salt:

$n_1$ by potentiometric titration using a solution of a ferrous salt;

$n_2$ by acid/base titration after the complexing of cerium using oxalate ions.

To produce the colloidal aqueous dispersions of a cerium (IV) compound according to the invention, an optionally pre-neutralized aqueous solution of a cerium (IV) salt is reacted with a base.

The base is preferably an aqueous ammonia solution. It is also possible to use gaseous ammonia.

The normality of the basic solution is not critical according to the invention; it may vary over wide limits, for example, from 0.1 to 11 N, but preferably solutions are used, the concentration of which ranges from 2 to 10 N.

The amount of base added is determined such that the pH of the reaction medium ranges from 4.0 to 9.0 and preferably from 5.0 to 7.0.

As a practical matter, the base is added to the aqueous solution of the cerium (IV) compound, or vice versa. The addition may be conducted all at once, gradually or continuously. It is carried out under agitation.

It is also possible to simultaneously and continuously mix the solution of the cerium (IV) salt with the basic solution.

Preferably, the preparation is carried out continuously.

The rates of addition of the reagent solutions are controlled as a function of the pH selected.

The temperature of the reaction medium advantageously ranges from 10° C. to 60° C. and preferably is ambient temperature, typically from 10° C. to 25° C.

The retention time of the precipitate in the reaction medium may range from 1 minute to several hours, for example, 48 hours or more; the upper limit is not critical. However, a period of time of from 5 minutes to 30 minutes is typically satisfactory.

The second stage of the process comprises separating the resulting precipitate, which is produced in suspension in the reaction medium.

The precipitate may be separated from the reaction medium by the usual solid/liquid techniques: filtration, centrifugation or draining.

The separation is typically carried out at ambient temperature.

The precipitate is then washed, preferably with water, and more preferably with deionized or distilled water.

One or more washings are carried out, most typically 1 or 2 washes.

A preferred embodiment of the washing operation comprises suspending the separated precipitate in water, in a proportion, for example, of 100 to 300 g/l.

After washing, the precipitate is separated by the aforementioned conventional techniques.

The free water content of the separated precipitate ranges from 20 to 80%, typically from 40 to 70%.

By eliminating the water in a forced manner, in particular by filtration under reduced pressure (for example, at from 10 to 200 mm mercury), it is possible to produce a cerium hydroxynitrate of the Formula (I) in which n is close to 0, i.e., $0 < n < 0.5$.

Consistent with this invention, a cerium hydroxynitrate of the Formula (I) is produced, which has the property of directly forming a colloidal aqueous dispersion in an acid medium, hereinafter referred to as a "sol".

A sol is produced which may contain a high concentration of cerium values, by adding the cerium (IV) compound of the Formula (I) to an aqueous solution of nitric acid having a pH of from 0.5 to 2.0.

Preferably, a pH of from 0.5 to 1.5 is selected.

The sol is preferably prepared under agitation and at a temperature preferably from 50° C. to 70° C. The duration of the heat treatment is not critical and may vary, for example, from 5 to 30 minutes. Typically, 5 to 10 minutes of treatment are sufficient.

In the resulting sol, the cerium (IV) compound is present essentially in the form of a colloidal dispersion in water, which connotes that the compound has particles colloidal in dimension, but this does not preclude the presence of cerium (IV) in ionic form.

The proportion of cerium (IV) in colloidal form typically ranges from 70 to 100%.

The aqueous sol according to the invention may have a high concentration in the cerium (IV) compound, since it may contain from 400 g/l to approximately 700 g/l by weight $CeO_2$.

The density of the sol, measured by weighing a predetermined volume, depends on the $CeO_2$ concentration and varies from 1.0 to 1.6, when measured at 20° C.

The resulting sol is only slightly sensitive to variations in ionic force, as shown in the examples to follow.

The size of the colloids is determined by measuring the mean hydrodynamic diameter of the colloids, determined by the quasi-elastic diffusion of light according to the method described by Michael L. McConnell in *Analytical Chemistry*, Vol. 53, No. 8, 1007 A (1981).

It depends upon the cerium (IV) concentration: the colloids become more coarse with increasing cerium concentrations, but their size remains relatively small at high concentrations.

Typically, the mean hydrodynamic diameter of the colloids ranges from 80 to 400 Å, usually from 80 to 300 Å.

It should be appreciated that the sols produced according to the invention are perfectly stable under usual storage conditions, also as shown in the examples to follow.

The aqueous colloidal dispersion of the invention are well adapted for use in the field of catalysis, in particular for the impregnation of catalytic supports.

In order to further illustrate the present invention and the advantages thereof, the following specific examples are given, it being understood that same are intended only as illustrative and in nowise limitative. In said examples to follow, all parts and percentages are given by weight.

EXAMPLE 1

(a) Preparation of a cerium (IV) compound having the Formula (I)

Into a double-jacketed reactor, in which water maintained at 20° C. was circulating and which had a useful volume of 500 cm$^3$ and was equipped with agitating means and a system for the introduction of the reagents, the following materials were introduced simultaneously and continuously:
  (i) an aqueous solution of ceric nitrate, containing 1 mole/liter of cerium (IV), 0.06 mole/liter of cerium (III) and having a free acidity of 0.46 N, prepared by electrolysis according to French Patent No. 84/13,641, at a rate of 2.6 liter/hr, and
  (ii) a 3 N aqueous ammonia solution, at a rate of 3.4 liter/hr.

Mixing of these materials was carried out under agitation, at 600 rpm, for a period of time of 5 minutes.

The rates of addition of the initial solutions were controlled in a manner such that the pH was maintained at 5.5.

The precipitate formed was separated by Buchner filtration.

The recovered precipitate was then washed twice by placing it in suspension, in water, 100 g precipitate per liter of water.

A moist product containing 45% of $CeO_2$ was obtained.

(b) Preparation of an aqueous sol of the cerium (IV) compound

To 12.5 g of a compound prepared according to (a), 15 cm$^3$ water and 3 cm$^3$ of a 3.5 N nitric acid solution were added. The solution was heated to 70° C. for 10 minutes, then permitted to cool to ambient temperature.

A sol having a concentration in $CeO_2$ of 200 g/l, a pH of 0.8 and a density of 1.19 was obtained.

Examination by the quasi-elastic diffusion of light evidenced the presence of colloids having a mean hydrodynamic diameter of 100 Å.

The resulting sol was stable in storage at ambient temperature for at least 6 months.

To 10 cm$^3$ of the sol prepared as above, 9 cm$^3$ of 4 M ammonium nitrate were added.

A sol containing 150 g/l ammonium nitrate was produced, having a colloid mean hydrodynamic diameter of 120 Å. The sol according to the invention was thus only slightly sensitive to variation in the ionic strength of the medium.

EXAMPLE 2

(a) Preparation of a cerium (IV) compound having the Formula (I)

This procedure was the same as that of Example 1.

(b) Preparation of an aqueous sol of the cerium (IV) compound

To 31 g of a compound prepared according to (a), 15 cm$^3$ water and 3 cm$^3$ of a 3.5 N nitric acid solution were added. The solution was heated to 70° C. for 10 minutes, then permitted to cool to ambient temperature.

A sol having a concentration, expressed in CeO, of 510 g/l and a density of 1.47, was produced.

Examination by the quasi-elastic diffusion of light evidenced the presence of colloids having a mean hydrodynamic diameter of 250 Å.

EXAMPLE 3

(a) Preparation of a cerium (IV) compound having the Formula (I)

Into an apparatus such as that described in Example 1, the following materials were simultaneously and continuously introduced:
  (i) an aqueous solution of ceric nitrate, containing 1.58 moles/liter cerium (IV), 0.06 mole/liter of cerium (III) and having a free acidity of 0.46 N, at a rate of 1.12 liter/hr, and
  (ii) a 3 N aqueous solution of ammonia, at a rate of 2.3 liter/hr.

The mixing was carried out under agitation, at 600 rpm.

The rates of addition of the initial solutions were regulated in a manner such that the pH was maintained at 4.7.

The precipitate which formed was separated by Buchner filtration.

Two washings were then carried out, by suspension in water.

A moist product containing 55% $CeO_2$ was obtained.

(b) Preparation of an aqueous sol of the cerium (IV) compound

To 12.5 g of a compound prepared according to (a), 15 cm³ water and 3 cm³ of a 3.5 N nitric acid solution were added. The solution was heated to 70° C. for 10 minutes, then permitted to cool to ambient temperature.

A sol having a concentration, expressed in CeO₂, of 225 g/l, a pH of 1.2, and a density of 1.21, was produced.

Examination by the quasi-elastic diffusion of light evidenced the presence of colloids having a mean hydrodynamic diameter of 113 Å.

EXAMPLE 4

(a) Preparation of a cerium (IV) compound having the Formula (I)

This procedure was the same as that of Example 3.

(b) Preparation of an aqueous sol of the cerium (IV) compound

To 32 g of a compound prepared according to step (a), 15 cm³ water and 3 cm³ of a 3.5 N nitric acid were added. The solution was heated to 70° C. for 10 minutes, then permitted to cool to ambient temperature.

A sol having a concentration, expressed in CeO₂, of 615 g/l, a pH 0.6 and a density of 1.57, was produced.

Examination by quasi-elastic diffusion of light evidenced the presence of colloids having a mean hydrodynamic diameter of 318 Å.

EXAMPLE 5

(a) Preparation of a cerium (IV) compound having the Formula (I)

Into a reactor equipped as in Example 1, 500 cm³ of an aqueous solution of ceric nitrate containing 1.8 moles/liter of cerium (IV), 0.06 mole/liter of cerium (III) and having a free acidity of 0.66 N, were introduced.

A 3 N aqueous solution of ammonia was added at a rate of 355 cm³/hr, until a pH of 5.5 was attained.

The reaction mixture was maintained under agitation at 400 rpm.

The precipitate formed was separated by Buchner filtration.

Two washings were then carried out, by suspension of the precipitate in water.

A moist product containing 43% CeO₂ was obtained.

(b) Preparation of an aqueous acid sol of the cerium (IV) compound

To 12.5 g of a compound prepared according to step (a), 15 cm³ water and 3 cm³ of a 3.5 N aqueous solution of nitric acid were added. The solution was heated to 70° C. for 10 minutes, then permitted to cool to ambient temperature.

A sol having a concentration, expressed in CeO₂, of 190 g/l and a pH of 0.9 was produced.

Examination by quasi-elastic diffusion of light evidenced the presence of colloids having a mean hydrodynamic diameter of 140 Å.

EXAMPLE 6

(a) Preparation of a cerium (IV) compound having the Formula (I)

Example 1 was repeated, except that the initial ceric nitrate solution was a solution pre-neutralized by the addition of 230 cm³ of a 2 N aqueous ammonia solution per liter of the ceric nitrate solution: the proportion of neutralization Was then equal to 0.025.

This solution was used as the initial reagent in the preparation of the cerium (IV) compound carried out according to the conditions of Example 1.

(b) Preparation of an aqueous acid sol of the cerium (IV) compound

To 12.5 g of a compound prepared according to step (a), 15 cm³ water and 3 cm³ of a 3.5 N nitric acid solution were added. The solution was heated to 70° C. for 10 minutes, then permitted to cool to ambient temperature. A sol having a concentration, expressed in CeO₂, of 240 g/l was obtained.

Examination by quasi-elastic diffusion of light evidenced the presence of colloids having a mean hydrodynamic diameter of 118 Å.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An aqueous acid colloidal dispersion of cerium (IV) hydroxynitrate comprising from about 400 g/l to about 700 g/l of cerium values, expressed as CeO₂, wherein said aqueous acid colloidal dispersion comprises a pH between 0.5 and 2.

2. The aqueous acid colloidal dispersion as defined by claim 1, comprising essentially pure cerium (VI) hydroxynitrate, the amount of cerium (IV) in colloidal form ranging from 70 to 100%.

3. The aqueous acid colloidal dispersion as defined by claim 1, having a density of from 1.0 to 1.6, measured at 20° C.

4. The aqueous acid colloidal dispersion as defined by claim 1, said colloids having a mean hydrodynamic diameter of from 80 to 400 Å.

5. The aqueous acid colloidal dispersion as defined by claim 4, said colloids having a mean hydrodynamic diameter of from 80 to 300 Å.

6. The aqueous acid colloidal dispersion as defined by claim 1, said cerium (IV) hydroxynitrate having the Formula (I):

$$Ce(OH)_x(NO_3)_y \cdot nH_2O \qquad (I)$$

wherein y ranges from 0.25 to 0.35; x = 4-y; and n ranges from 0 to about 20.

7. The aqueous acid colloidal dispersion as defined by claim 6, wherein n ranges from 2 to 5 in said cerium (IV) hydroxynitrate having the formula (I).

8. A process for the preparation of the aqueous acid colloidal dispersion as defined by claim 1, comprising precipitating a cerium (IV) hydroxynitrate having the Formula (I):

$$Ce(OH)_x(NO_3)_y \cdot nH_2O \qquad (I)$$

wherein y ranges from 0.25 to 0.35; x = 4-y; and n ranges from 0 to about 20 by reacting an aqueous solution of a cerium (IV) salt with a quantity of base sufficient to maintain said solution at a pH between 4.0 and 9.0, washing said precipitate, and dispersing the washed precipitate in an aqueous acid medium having a pH between 0.5 and 2.

9. The process as defined by claim 8, said cerium (IV) salt comprising cerium (IV) hydroxynitrate.

10. The process as defined by claim 9, said cerium (IV) hydroxynitrate having been prepared by electrolytic oxidation of a solution of ceriuos nitrate.

11. The process as defined by claim 9, said cerium (IV) hydroxynitrate having been prepared by reacting nitric acid with hydrated ceric oxide.

12. The process as defined by claim 8, further comprising pre-neutralizing said aqueous solution of the cerium (IV) salt such that the proportion of neutralization ranges from −4 to 2.

13. The process as defined by claim 8, wherein the concentration of said solution of the cerium (IV) salt ranges from 0.3 to 3 moles per liter.

14. The process as defined by claim 8, said base comprising an ammonia solution.

15. The process as defined by claim 8, wherein the pH of the reaction medium ranges from 5 to 7.

16. The process as defined by claim 8, wherein said dispersing in an aqueous acid medium comprises heating at a temperature of between 50° C. and 70° C.

17. A process for the preparation of the aqueous acid colloidal dispersion as defined by claim 1, comprising precipitating said cerium (IV) hydroxynitrate by reacting an aqueous solution of a cerium (IV) salt with a quantity of base sufficient to maintain said solution at a pH between 4.0 and 9.0, separating said precipitate from the solution, washing said separated precipitate, and directly dispersing the washed precipitate in an aqueous acid medium having a pH between 0.5 and 2.

18. A process for the preparation of cerium (IV) hydroxynitrate comprising precipitating said cerium (IV) hydroxynitrate having a mole ratio of $NO_3/CeO_2$ of from 0.25 to 0.35 by reacting an aqueous solution of a cerium (IV) salt with a quantity of base sufficient to maintain said solution at a pH between 4.0 and 9.0.

19. The process as defined by claim 18, further comprising washing said cerium (IV) hydroxynitrate and dispersing said washed cerium (IV) hydroxynitrate in an aqueous acid medium having a pH between 0.5 and 2.0 to form an aqueous acid colloidal dispersion.

* * * * *